Dec. 22, 1942. J. MYERS ET AL 2,306,180
ELECTRIC WELDING
Filed June 16, 1938
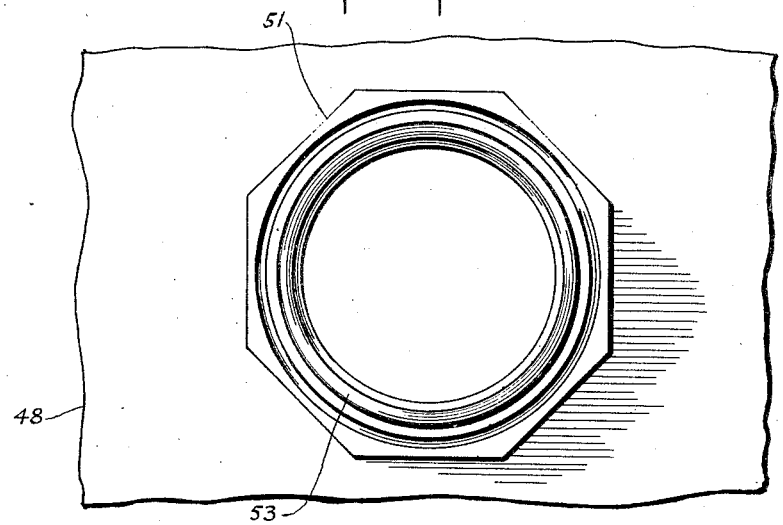
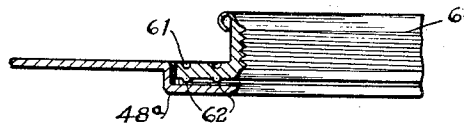
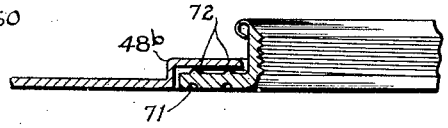
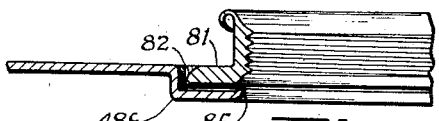
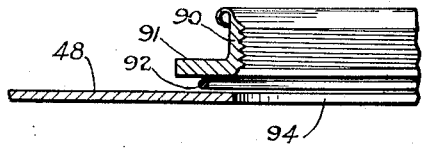
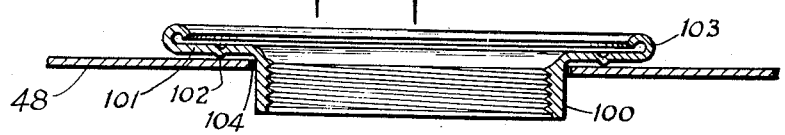
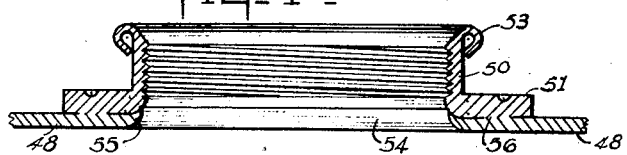
INVENTORS.
JACOB MYERS
BY MAX WELLS WILLIAMS
*Albert M. Parker*
ATTORNEY Patented Dec. 22, 1942

2,306,180

UNITED STATES PATENT OFFICE 2,306,180

ELECTRIC WELDING

Jacob Myers, New York, N. Y., and Max Wells Williams, Welwyn, England, assignors to American Flange & Manufacturing Company, Inc., New York, N. Y., a corporation of Illinois Application June 16, 1938, Serial No. 213,964
In Great Britain June 25, 1937

4 Claims. (Cl. 285—49)

This invention concerns improvements in flanged bushings for welding in place in the walls of metal containers, such as metal drums, and also concerns the combination of the flanged bushings with the container wall. The attachment of such flanged bushings is commonly necessary in the preparation of drums and other metal containers for the reception of stoppers or bungs, threaded or inserted otherwise.

The particular object of the invention is to provide a bushing-container wall combination which can be formed rapidly and economically by welding, but nevertheless insures a liquid-tight and air- or gas-pressure proof joint.

According to the invention, in the attachment of flanged bushings by welding, particularly on drums and other metal containers, an annular rib or collar is provided on or between the members being united for facilitating the welding. By this means, it is ensured that the welding is substantially uniform, making a liquid tight and air- or gas-pressure proof joint.

In the case of the welding of a flanged bung-bushing to a metal drum, the annular projection is preferably formed in the metal of the flanged skirt. Alternately, however, the projection may be formed in the lighter metal of the drum or co-acting projections may be formed upon both the drum-stock and the flange. In all cases, the projection is upon the inner face of the part, i. e. that face which is to be united to the other part. The projection may be constituted simply by an elevation on the one face of the part, but is preferably formed by pressing up a ridge from the material of the part so that a depression is left in the outer face thereof. When welding is performed, the projection disappears and the material is flattened out under the influence of the welding action and the mechanical pressure. In some cases, the projection might even be constituted by an annular strip or wire ring placed between the two parts. It is to be noted that the annular projection need not be circular. Particularly with polygonally or triangularly flanged bushings, the projection may, if desired, be polygonal or triangular.

Whatever the nature of the projection employed, its effect is to localize the contact between the parts to be united and thus to insure that the action of the welding current and of the mechanical pressure takes place around the line of the joint and is distributed as uniformly as possible around that line.

According to an alternative method by which the combination of the invention may be formed, a seam-weld is produced by applying opposed wheel-electrodes to the outer faces of the flange and of the drum or barrel stock and causing the said electrodes to describe an annular path following the line of the required joint.

For various reasons the welded joints of container-wall-closure flange combinations heretofore provided have not been satisfactory. The work has almost universally been done by hand by means of a torch or arc, a bushing with a heavy cast iron collar has been employed and material from a welding rod, or the like, was necessary in forming the seam. This seam was around the outer edge of the bushing collar and partially filled the angle formed by this collar and the adjacent container wall. Accordingly, it was exposed to the atmosphere and was uneven and unsightly. Furthermore, the mere appearance of the joint had to be relied upon to determine when it was leak-proof, this type of test being in many cases fallacious since uneven heating of one or both of the parts being welded, uneven distribution of the melted welding rod, or other factors, would enter in to prevent the formation of a tight joint. Skilled labor was required and even so the process was slow and tedious.

As already indicated, welded flanges were bulky, and being made of cast iron would rust readily. They included no provision for installing a tamper-proof and leak-proof seal, and, in fact, it was necessary in them to provide a broad, flat outer surface on the flange. Against this a heavy fiber gasket carried by the plug or bung beneath a collar therearound was compressed. Obviously this whole scheme was an unsatisfactory one in the light of modern production methods.

The undesirable features outlined above are eliminated by applicants' invention in which a flange or bushing is provided whose stock is reduced to a minimum and which is adapted for securing to the container wall, without following the tedious method previously practiced. The flange of applicants' invention besides being light in weight and yet of entirely adequate strength is provided with means for receiving a seal cap. Thus, another crying need of welded constructions has been satisfied.

Fig. 1 is a section of the closure-member container wall combination of the invention, after the weld has been made.

Fig. 2 is a plan view of the same.

In Figs. 3 to 7 are views similar to that of Fig. 1 showing various alternative constructions positioned and arranged for the commencement of the welding operation.

In Fig. 1 there is shown a section of container-wall stock at 48 having an opening 54 therein. A flange or bushing generally shown at 50 extends upward in alignment with said opening and has a laterally-extending base 51 overlying that portion of the container-wall stock around the opening 54. The open mouth of the flange 50 is provided with an out-turned bead 53 while the opening in the container wall is formed with an upwardly extending lip 55 therearound.

In order to apply this bushing or flange to a container wall having a properly formed opening therein, all that a workman has to do is to insert the container wall 48 into proper position in the welding device and slide the flange 50 over the surface of the wall 48 until it registers with the lip 55. This requires no skill at all, merely a sense of feel. The flange is thus accurately registered with the opening 54 ready for the welding operation. If by any chance the registry was not exact a check on it is provided by the bead 53 which would engage with the welding device and easily follow it to shift the flange or bushing slightly. The bead 53 is also valuable on the completed closure for the reception of a cap seal to be referred to hereinafter.

Particular attention is directed to the common zone 56 between the container wall 48 and the flange skirt 51. Here there is shown the merger of the materials of flange skirt 51 and container wall 48 due to the weld having been completed. From this we see that the weld is entirely within the confines of the overlapped portions of skirt 51 and container wall 48, that no welding rod has been added and that the construction is as neat and light as was the case before the weld was made. Nevertheless, the union has all the strength of an integral piece of metal and is acordingly as strong or stronger than any part of the drum.

In Fig. 3 the drum stock is shown as downwardly embossed at 48ª, while the flange 60 has its skirt portion 61 provided with a plurality of current localizing ribs 62. In all other respects the construction is the same as that shown in Figs. 1 and 2.

In Fig. 4 the embossing 48ᵇ is formed upwardly and the skirt 71 of flange 70 is received therebeneath. Similar to the showing in Fig. 3, a plurality of current localizing ribs 72 is provided.

The alternative shown in Fig. 5 has the container wall surrounding the aperture downwardly embosesd at 48ᶜ similar to the embossing shown in Fig. 3. Here, however, current localization is accomplished by turning downwardly the periphery 82 of the flange skirt 81 into the form of a thin neck. Likewise the stock of the container wall surrounding the opening is turned upwardly, as shown at 85 similar to the upward turning shown at 55 in Fig. 1.

In Fig. 6, an alternative is shown where the unembossed container wall 48 is shown as apertured at 94. Defining aperture 94 is flange 99 whose skirt 91 is smooth. Between the undersurface of skirt 91 and the opposed upper face of container wall 48, however, is located a wire ring 92. This ring acts as the current localizing member and is formed of a material suitable for expediting the welding operation. Such materials are known to those skilled in the art.

In Fig. 7 a slightly different form is shown wherein the neck of the flange 100 extends through the aperture 104 of the container wall 48. In this instance the flange skirt 101 is wider than those previously provided and overlies the container wall on the upper side thereof. Similar to the form shown in Figs. 1 to 4, however, skirt 101 is provided with a current localizing rib or ribs 102. The outer end of the skirt is bent upwardly and beaded inwardly, as shown at 103, which provides for the reception of a seal cap of known construction which can be crimped over the mounting bead 103.

In all of the forms shown it is to be understood that though bead 53, or the like, facilitates accurate locating of the flange for purposes of the welding operation, the bead also performs another function. This function is that of enabling a seal cap of the type shown in United States Patent Nos. 1,982,144 and 1,982,145 to be applied over the neck of the flange. This provision of means whereby the closure may be sealed is a decided advance in this art, since heretofore no such provision has been made or has been thought possible with flanges which are welded to container walls. Furthermore, it is to be clearly understood that provision of rib or ribs, such as 52, 62, etc., on the flange skirt is merely for the purposes of illustration, since they might be formed with equal facility on the container wall itself.

We claim:

1. In structure of the character described, a container wall having an opening therein, a bushing defining said opening, said bushing having a laterally extending collar portion overlying a portion of said container wall surrounding said opening, said laterally extending collar portion and said container wall portion being unitarily joined throughout a zone common to each and spaced from said opening, and said bushing having its exterior end formed for the reception of a seal cap thereover.

2. In structure of the character described, a container wall having an opening therein, a bushing member adapted to be secured to said container wall for defining said opening, said bushing member having a laterally extending skirt overlying the portion of the stock of said container wall surrounding said opening and a current localizing annulus spaced from the opening in said container wall for localizing the welding current passed through said laterally extending skirt and said opposed container wall portion, said annulus, before fusion, spacing apart the flat opposed faces of said skirt and said container wall stock.

3. In structure of the character described, a container wall having an opening therein, an upwardly extending locating lip adjacent said container wall opening, a bushing adapted to be secured to said container wall for defining the opening therein, said bushing having a portion formed to receive and overlie said locating lip and a flange on said bushing extending laterally and free of said bushing for a substantial distance to overlie said container wall stock adjacent said opening, whereby proper positioning of said bushing with respect to said opening can be rapidly accomplished.

4. In structure of the character described, a container wall having an opening therein, an annular locating lip formed on said container wall adjacent said opening and an embossing formed in said container wall stock surrounding said opening, a bushing adapted to be secured to said container wall for defining said opening, said bushing having a portion formed for reception of and engagement with said locating lip and having a laterally extending portion for reception in said embossing and a current localizing annulus extending between said laterally extending portion of said bushing and the base of said embossing.

JACOB MYERS.
MAX WELLS WILLIAMS.